(12) United States Patent
Yamada

(10) Patent No.: US 6,428,688 B2
(45) Date of Patent: Aug. 6, 2002

(54) OIL PATH STRUCTURE

(75) Inventor: Shinji Yamada, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/761,666

(22) Filed: Jan. 18, 2001

(30) Foreign Application Priority Data

Jan. 31, 2000 (JP) ........................................ 2000-022573

(51) Int. Cl.$^7$ ............................. F01M 1/00; F01L 1/34
(52) U.S. Cl. ..................... 210/110; 210/168; 210/138; 123/196 A; 123/90.15
(58) Field of Search ................................ 210/138, 418, 210/168, 110, 171; 123/90.15, 90.16, 90.17, 196 A

(56) References Cited

U.S. PATENT DOCUMENTS 5,797,363 A * 8/1998 Nakamura
6,177,010 B1 * 1/2001 Schamel et al.

* cited by examiner

Primary Examiner—Joseph W. Drodge
Assistant Examiner—Terry K. Cecil
(74) Attorney, Agent, or Firm—Nath & Associates pllc; Gary M. Nath; Marvin C. Berkowitz

(57) ABSTRACT

The oil filter 23 is situated downstream of the oil control valve 4 while extending in the axial direction of the advance-angle side oil path. Therefore, any foreign matter existing between the control valve 4 and the actuator 3 is removed by the filter 23 to prevent foreign matter from becoming lodged in the oil control valve 4. This stabilizes the operation of the variable valve timing mechanism.

8 Claims, 14 Drawing Sheets

OIL PATH STRUCTURE

BACKGROUND OF THE INVENTION

1. Field of the Invention

The present invention relates to an oil path structure of an operation hydraulic circuit to control an operation oil pressure in a variable valve timing mechanism of an engine, in particular, an oil path structure in which an oil filter is provided between an oil control valve and an actuator.

2. Description of Related Art

Conventionally, a variable valve timing mechanism which varies an opening-closing timing of a suction-exhaust valve by shifting a rotating phase of a camshaft to a rotation of a crankshaft is employed in an engine. In general, in an engine having a variable valve timing mechanism an actuator 3 makes a rotation of the camshaft 2 shift relative to a rotation of the crankshaft 1 by an oil control valve 4 that controls the suction and exhaust of an operation oil of the actuator 3 such as shown in FIGS. 10 to 12. Such an actuator 3 and oil control valve 4 are in communication with each other by an advance-angle side oil path 5 and a delay-angle side oil path 6 as shown in FIG. 3. The actuator 3 is operated on the advance-angle side by moving the oil control valve 4 and being loaded with operation oil in the advance-angle oil path 5, and on the delay-angle side by being loaded with operation oil in the delay-angle oil path 6. Furthermore, the oil control valve 4 is provided with a solenoid 8 which is operated based on a control signal of an ECU (electronic control unit) 7 as shown in FIGS. 4 and 5. The oil control valve 4 varies a valve timing by controlling the suction-exhaust of the operation oil in the actuator 3 by sliding spool 4b in housing 4a in response to the solenoid 8 in such a manner that the rotating phase of the camshaft 2 is shifted in relation to the rotation of the crankshaft 1. In such an actuator 3 of the variable valve timing mechanism, a housing 10 rotates integrally with a camshaft timing sprocket 9; and vanes 11, rotatable around a rotation shaft of the camshaft sprocket 9, rotates within a given range relative to the housing 10. To operate the actuator 3 on the advance-angle side, a spool 4b of oil control valve 4 is moved right-like in FIG. 6 from an intermediate position of FIG. 6 to cause a supply port 12 of the operation hydraulic oil to be communicated with the advance-angle side port 13 and a drain port 15 is made to be communicated with the delay-angle side port 14. Thereby, as shown in FIGS. 4 and 5, the operation oil pressure is loaded on the advance-angle side oil pressure chamber 16 of the actuator 3, and an oil filled in a backward-side pressure chamber 17 is returned to the oil control valve 4 and exhausted from the drain port 15. As a result, the vanes 11 are turned to the advance-angle side relative to the housing 10, that is to the camshaft timing sprocket 9, thereby, the valve timing can be shifted to the advance-angle side. For reference, the operation oil of the variable valve timing mechanism is sucked from oil reserved in an oil pan 18 by an oil pump 19, filtered through an oil filter 22, and pressurized and transmitted to the oil control valve 4 through a branching oil path 20 and oil path 21 as shown in FIGS. 4 and 5.

Further, in such an oil control valve 4a spool 4b fits slidably in a spool hole 4c. The spool 4b is a precisely worked part, so that, if any foreign matter in the operation oil becomes engaged between the spool 4b and the spool hole 4c, the operation of the oil control valve 4 may malfunction. Japanese Utility Model laid-open No. Hei 7-42402 discloses an oil filter for operation oil removable through an opening provided outside an engine is provided in the oil path 21 upstream of the oil control valve 4.

However, in the invention disclosed in the above UM Model laid-open No. Hei 7-42402, it is impossible to remove some foreign matters mixed in the operation oil which is returned to the oil control valve 4 from the actuator 3. As a result, such foreign matters can become engaged with between the spool 4b and the spool hole 4c, and thereby risk causing a malfunction of the oil control valve 4. Further, this oil filter is disclosed disposed at an intersection between perpendicularly crossed oil paths where the operation oil flows inward from a cylindrical opening and flows outward from a side, with the result that a loss of pressure is great, so that, a functional (response function) decrease of the variable valve timing mechanism is problematic.

Therefore, the present invention has been made in the light of the above circumstance, an object of the present invention is to provide an oil path structure in which the operation of the variable timing mechanism is stabilized by providing an oil filter at the downstream of the oil control valve and removing any foreign matter in the operation oil existing between the oil control valve and the actuator.

In order to attain the above object, according to a first aspect of the present invention, an oil path structure for lubricant of an engine in a branching path where a variable valve timing mechanism controls supply and exhaust of oil in an operational oil pressure circuit, comprises an oil filter provided downstream of the oil control valve and extending axially in the direction of an oil path.

By being structured like the above, any foreign matter existing in the operation oil can be removed. Since the oil filter is set while extending in an axial direction, a diameter of the filter can be reduced.

Further, according to a second aspect of the present invention, disposed between the oil control valve and the actuator of the variable timing mechanism are an advance-angle side oil path to operate the actuator to a advance-angle side by being loaded with the operation oil pressure, a delay-angle side oil path to operate the actuator to a delay-angle side by being loaded with the operation oil pressure, and an oil filter set in at least on one of the advance-angle side oil path and the delay-angle side oil path.

By being structured like the above, any foreign matter possibly existing in the operation oil at the downstream of the oil control valve can be removed.

According to a third aspect of the present invention, an oil filter is positioned with its side to a portion where actuator 3 and oil control path are crossed.

By being structured like the above, a pressure loss at the time of passing of the operation oil through the oil filter is extremely reduced.

According to a fourth aspect of the present invention, an oil filter is set in such a manner as it is extended upward linearly from the oil control valve mounting face.

By being structured like the above, foreign matters captured through an oil filter or deposited in a hole set with the oil filter are easily removed. Further, since the area of a filter through which the operation oil passes can be made large, the filter is not likely to become clogged and thus a maintenance cycle of the filter can be set longer.

According to a fifth aspect of the present invention, an oil filter is provided with a sleeve, and its side is formed of a bottomed cylinder of mesh which is fit with the oil path to be formed.

By being structured like the above, the structure of the oil filter can be simplified. Further, since an occupied volume of an oil filter can be set small, an oil filter can be set in the operation oil path for both of the advance-angle side oil path and the delay-angle side oil path.

DETAILED DESCRIPTION OF THE PREFERRED EMBODIMENT

Figure 1:
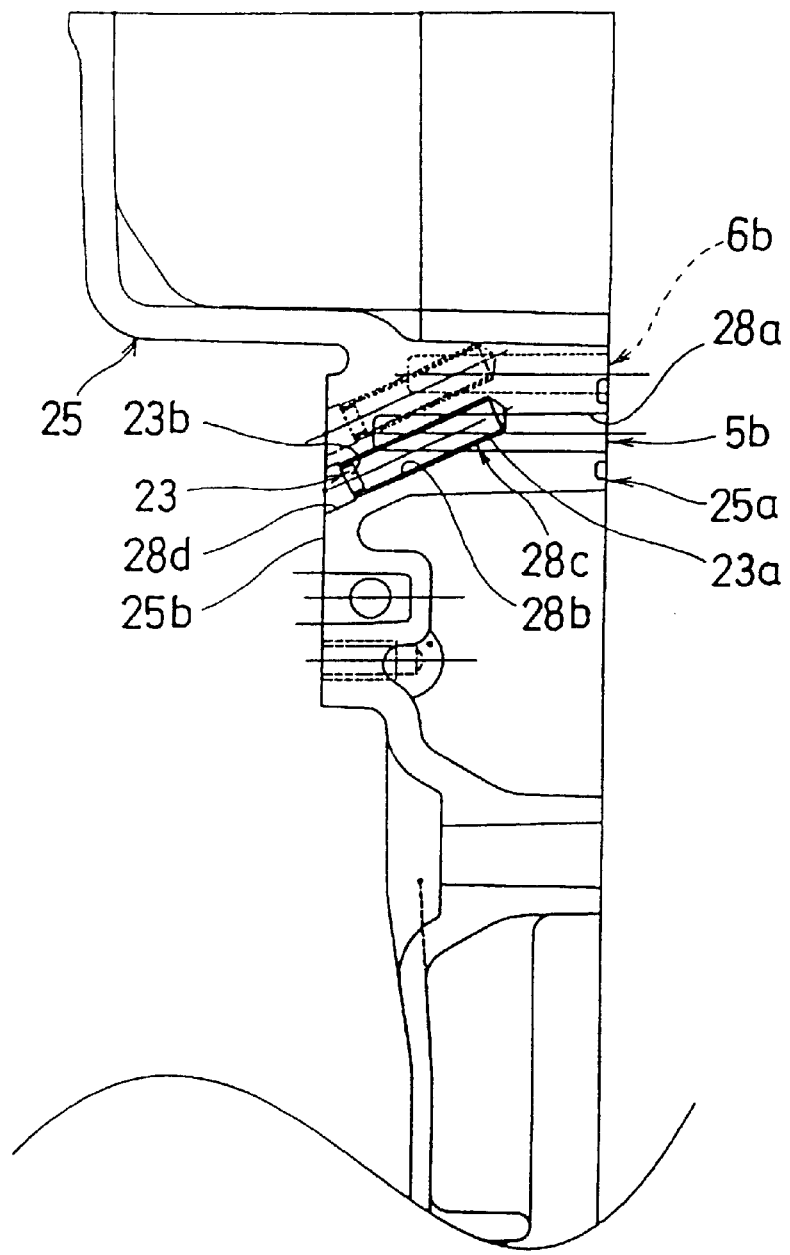
FIG. 1 is a vertically sectional drawing showing an oil path structure of an embodiment of the present invention in particular of a advance-angle side oil path of one portion of a timing chain case.
Figure 2:
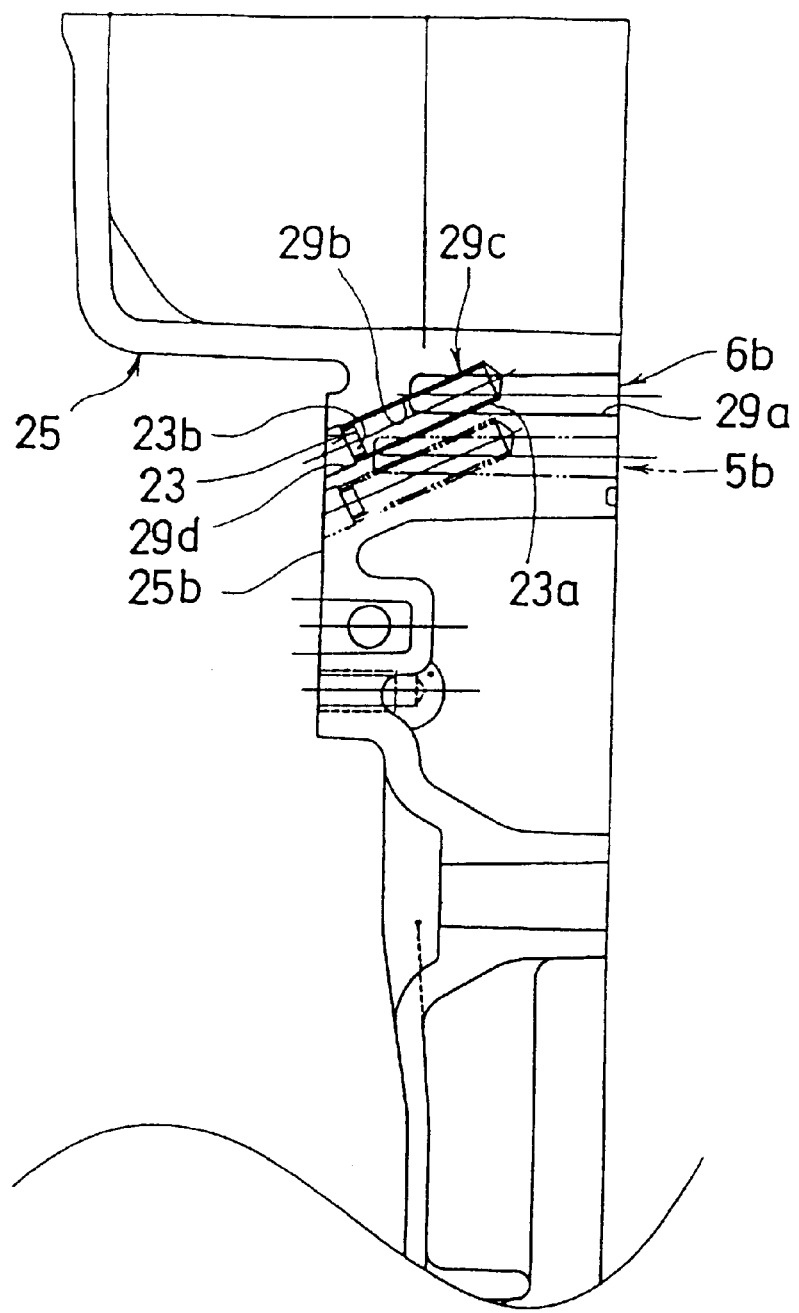
FIG. 2 is a vertically sectional drawing showing an oil path structure of an embodiment of the present invention in particular of a delay-angle side oil path of one portion of a timing chain case.
Figure 3:
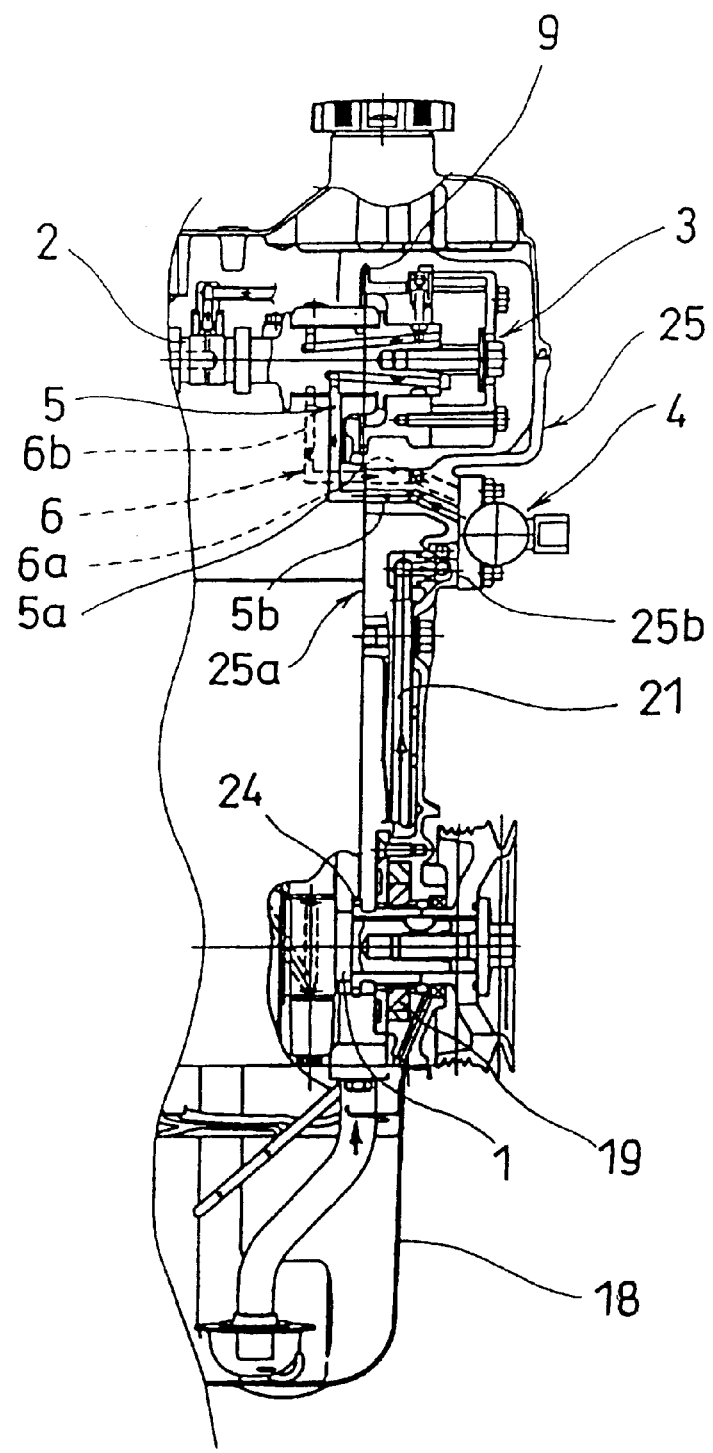
FIG. 3 shows an operation oil path of an engine with a variable valve timing mechanism.

An embodiment of an oil path structure of the present invention is explained based on FIGS. 1 to 9. First, an outline of an oil path structure of an embodiment of the present invention is explained. In an oil path of the embodiment of the present invention, an oil filter 23 is disposed downstream of an oil control valve 4 to control a supply-exhaust of an operation oil pressure to the actuator 3 of a variable valve timing mechanism so that any foreign matter existing in the operation oil between the actuator 3 and the oil control valve 4 is adapted to be removed. Further, in the oil path structure of the embodiment of the present invention, as shown in FIG. 3, the advance-angle side oil path 5 and the delay-angle side oil path 6 are disposed between the actuator 3 of the variable valve timing mechanism and the oil control valve 4 which controls the operation oil pressure to the actuator 3, and in each oil path 5, 6 the oil filter 23 (see FIG. 9) is set. For reference, the operation oil to operate the actuator 3 of the variable valve timing mechanism is pressurized to be transmitted to the oil control valve 4 by the oil pump 19 (see FIG. 3).

Figure 11:
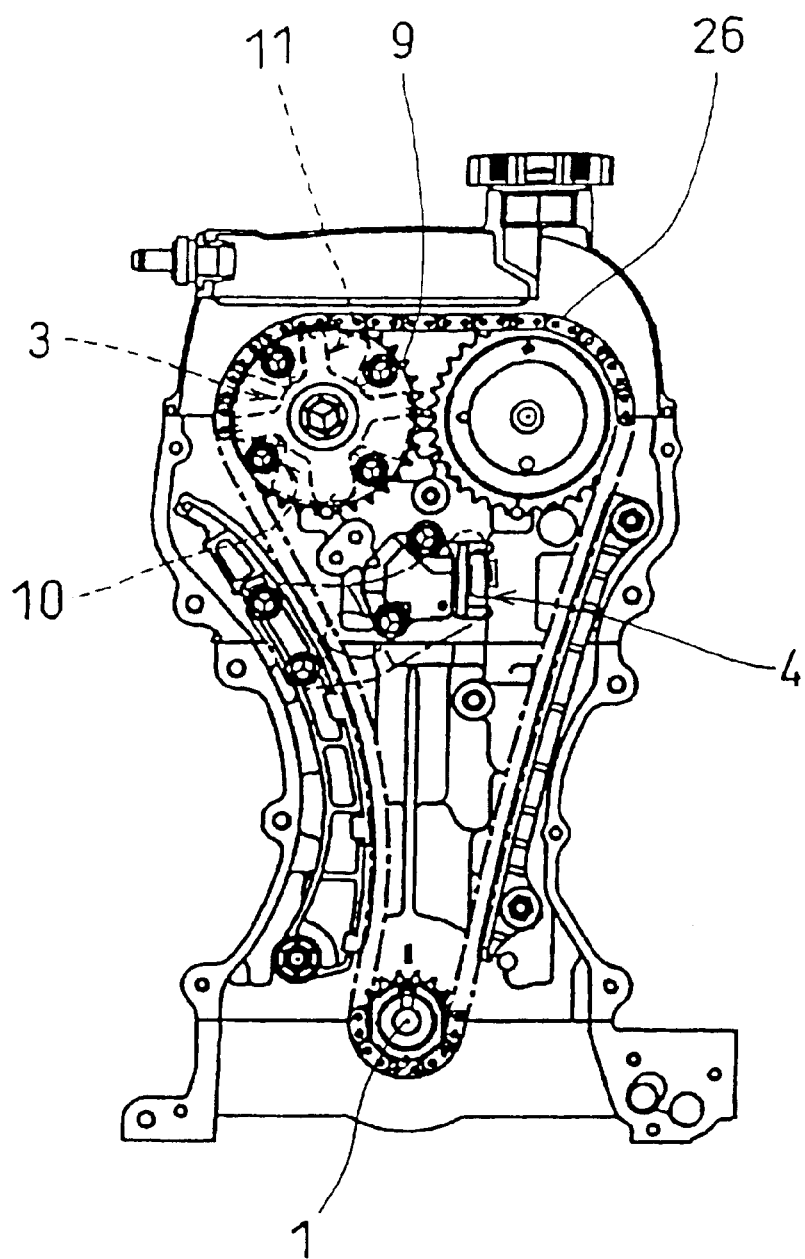
FIG. 11 is a side view of an engine with a variable valve timing mechanism, partially in section.
Figure 12:
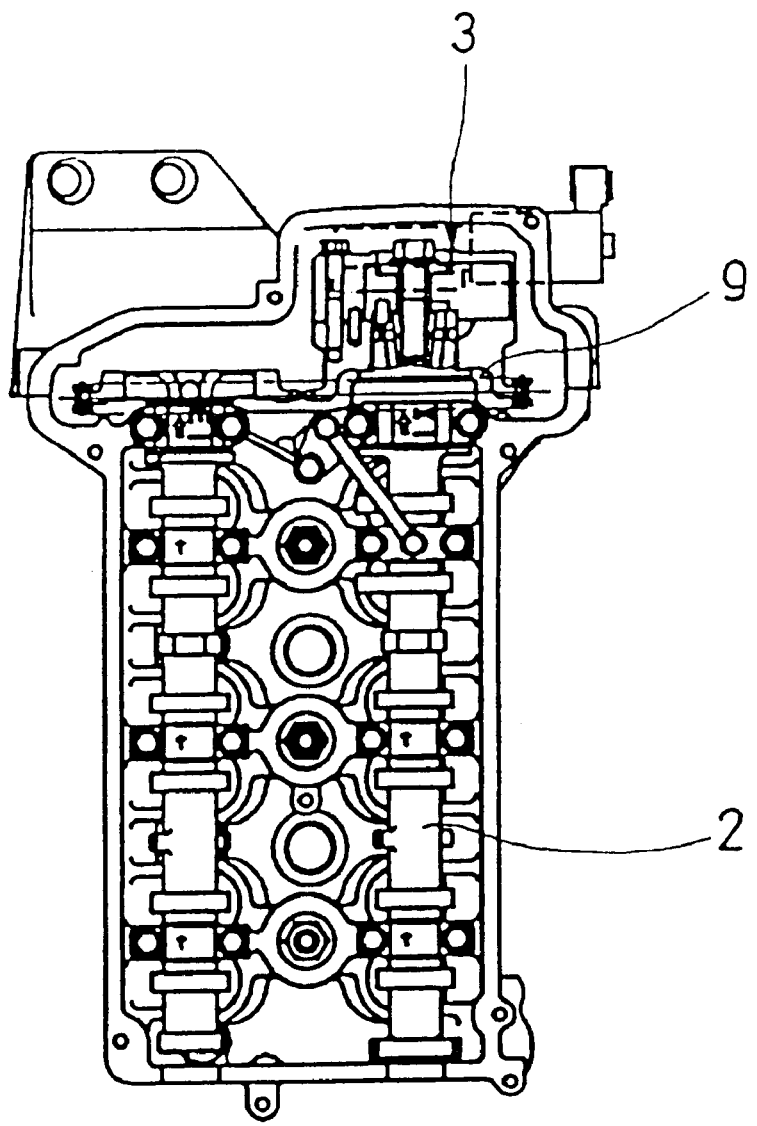
FIG. 12 is a plan view of an engine with a variable valve timing mechanism, partially in section.
Figure 13:
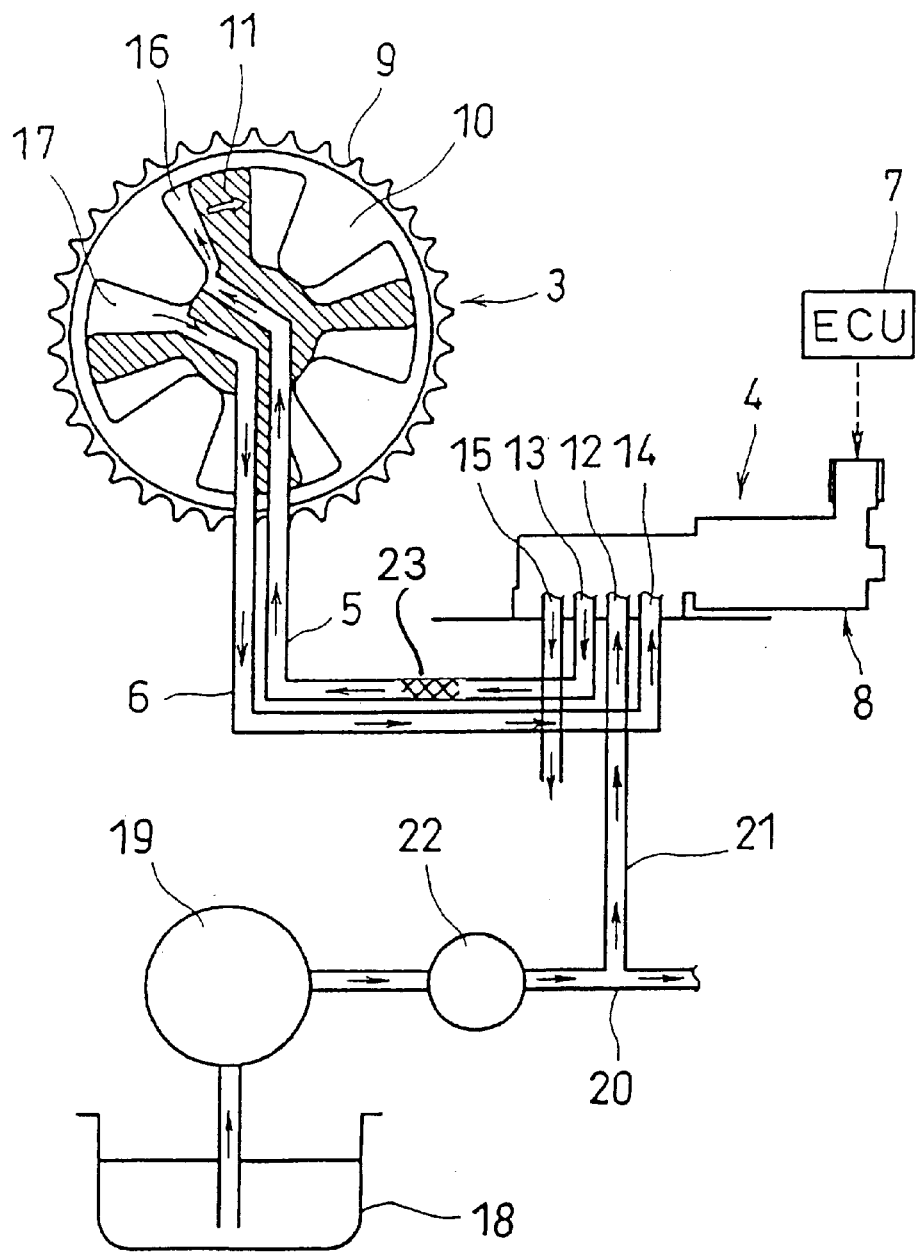
FIG. 13 is a schematic diagram of an embodiment of the instant invention showing a filter disposed in an advance-angle side oil path of an operation oil pressure circuit of the variable valve timing mechanism.
Figure 14:
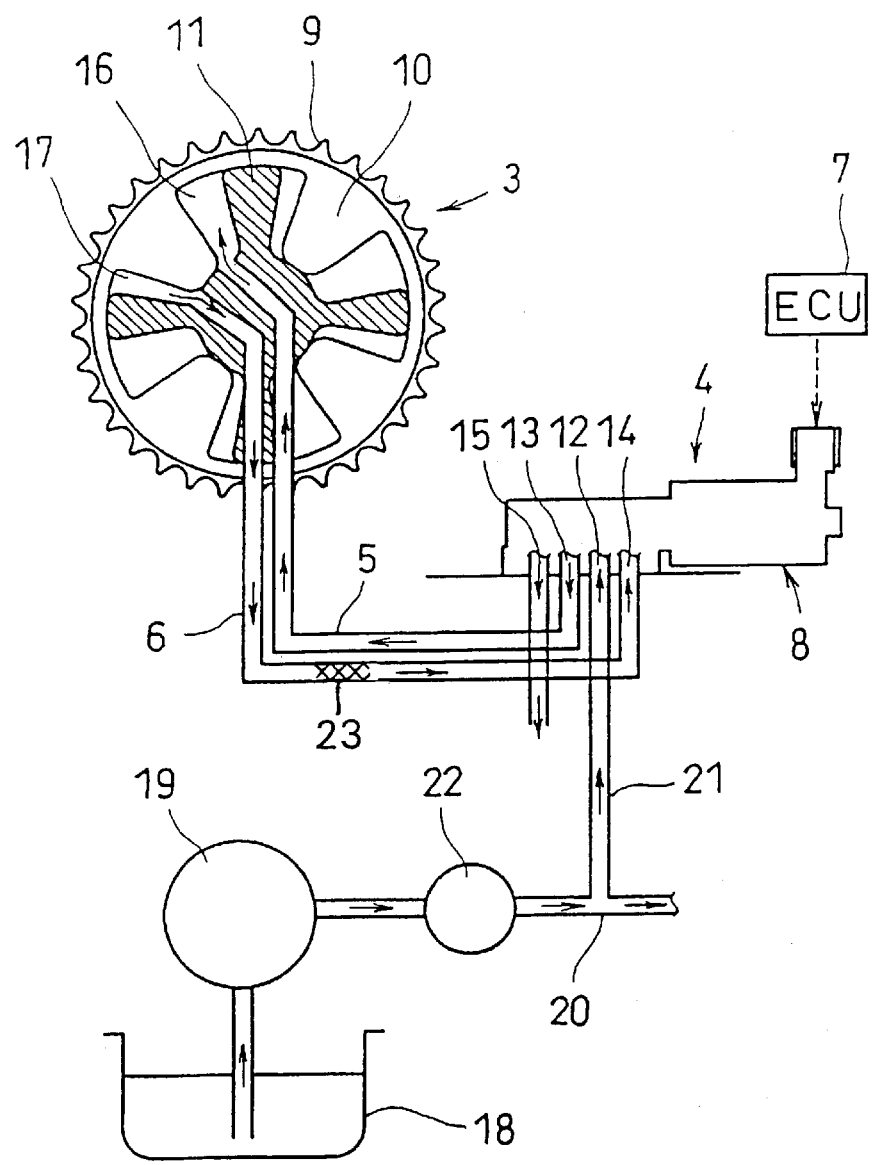
FIG. 14 is a schematic diagram of an embodiment of the instant invention showing a filter disposed in a delay-angle side oil path of an operation oil pressure circuit of the variable valve timing mechanism.

Next, the variable valve timing mechanism is explained. A timing chain 26 (see FIG. 11) is wound around a crank sprocket 24 and a camshaft timing sprocket 9, as shown in FIG. 3, and the camshaft 2 is made to be synchronized with the crankshaft 1 to be rotated. The actuator 3 is operated such that by changing a rotation phase of the camshaft 2 in relation to the crankshaft 1, a valve timing is shifted to an advance-angle side or a delay-angle side.

Figure 4:
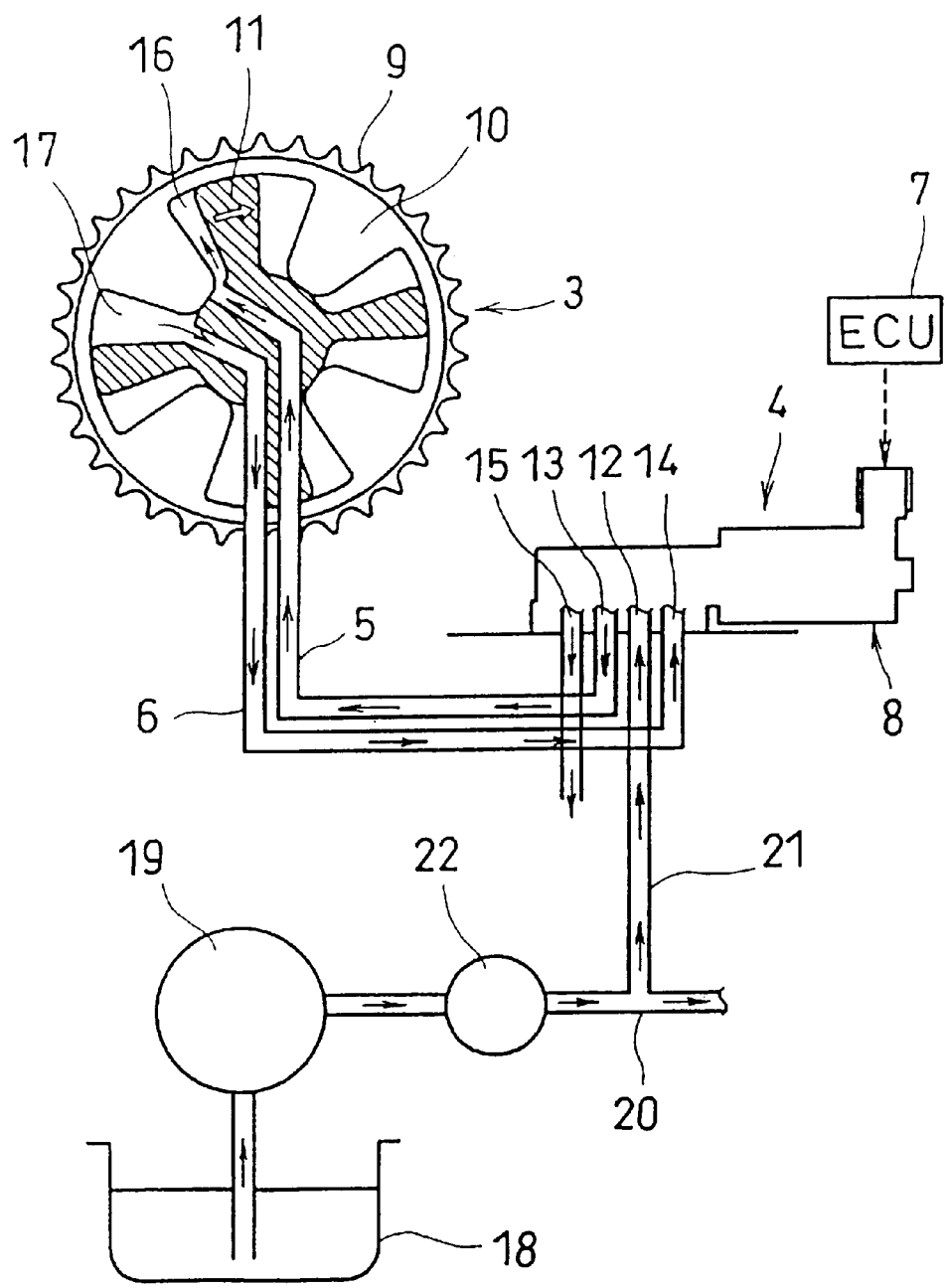
FIG. 4 is a schematic diagram showing an operation oil pressure circuit of the variable valve timing mechanism.
Figure 5:
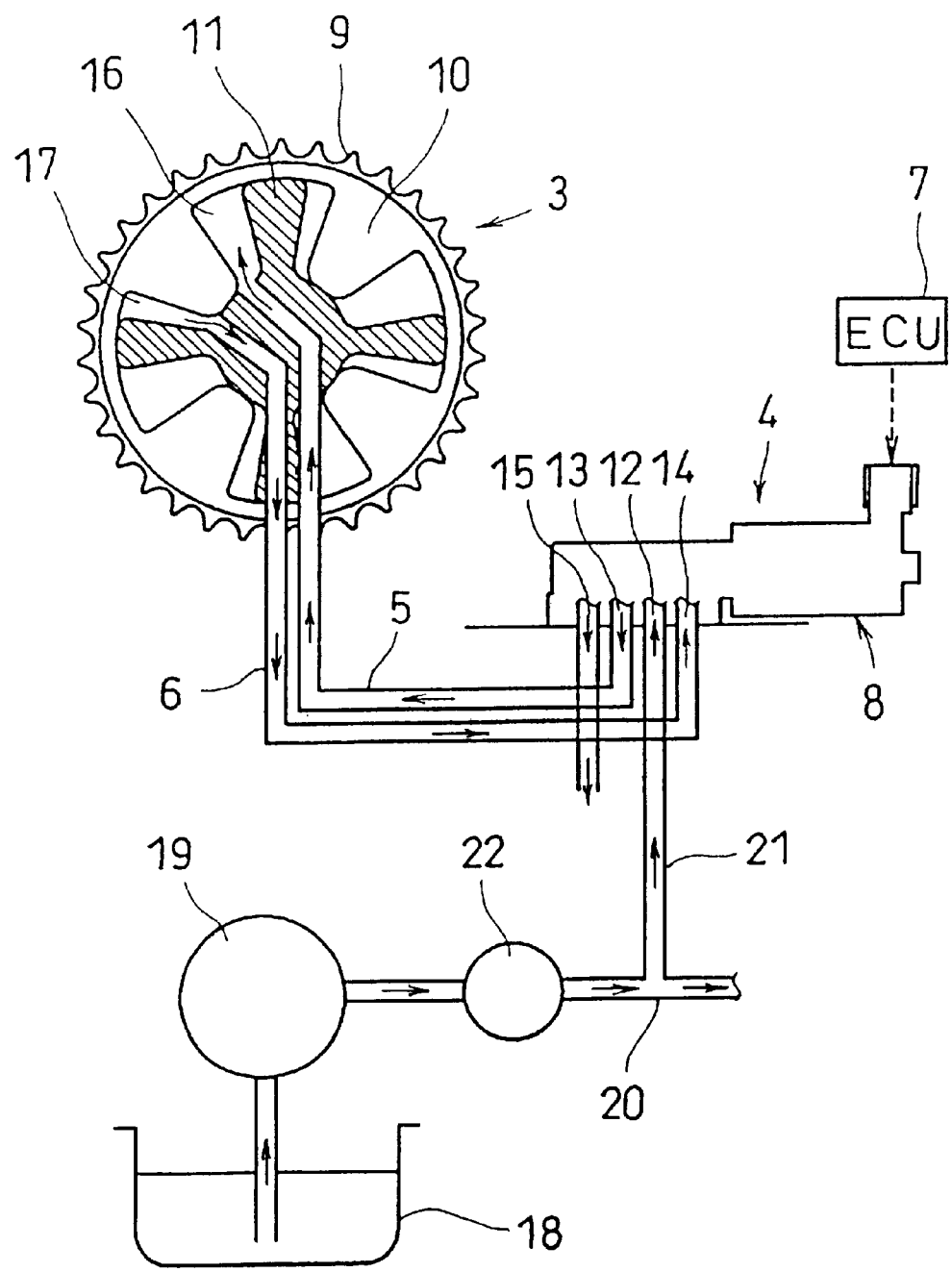
FIG. 5 is a schematic diagram showing an operation oil pressure circuit of the variable valve timing mechanism.

In the actuator 3 of such a variable valve timing mechanism, as shown in FIGS. 4 and 5, a housing 10 rotates integrally with the camshaft timing sprocket 9 while vanes 11 are provided to shift a rotation phase of the camshaft 2 in relation to the crankshaft 1 by turning around the rotation shaft of the camshaft 2. The valve timing is shifted to the advance-angle side by switching the oil control valve 4 so that the operation oil pressure is made to be loaded on the advance-angle side oil pressure chamber 16 formed in the actuator 3 and the operation oil in the delay-angle side oil pressure chamber 17 is made to be exhausted from the delay-angle side oil path 6 as shown in FIG. 4. Thereby, the vane 11 is turned clockwise in FIG. 4 relatively to the housing 10, as shown in FIG. 5, such that a rotation phase of the camshaft 2 relative to the crankshaft 1 is shifted to the advance-angle side. The valve timing is shifted to the delay-angle side by switching the oil control valve 4 so that the operational pressure is made to be loaded in the delay-angle side oil pressure chamber 17 and the operation oil in the advance-angle side oil pressure chamber 16 is made to be exhausted from the advance-angle side oil path 5. Thereby, the vane 11 is rotated anti-clockwise relative to the housing 10, such that the rotation phase of the camshaft 2 relative to the crankshaft 1 is shifted to the delay-angle side.

Figure 6:
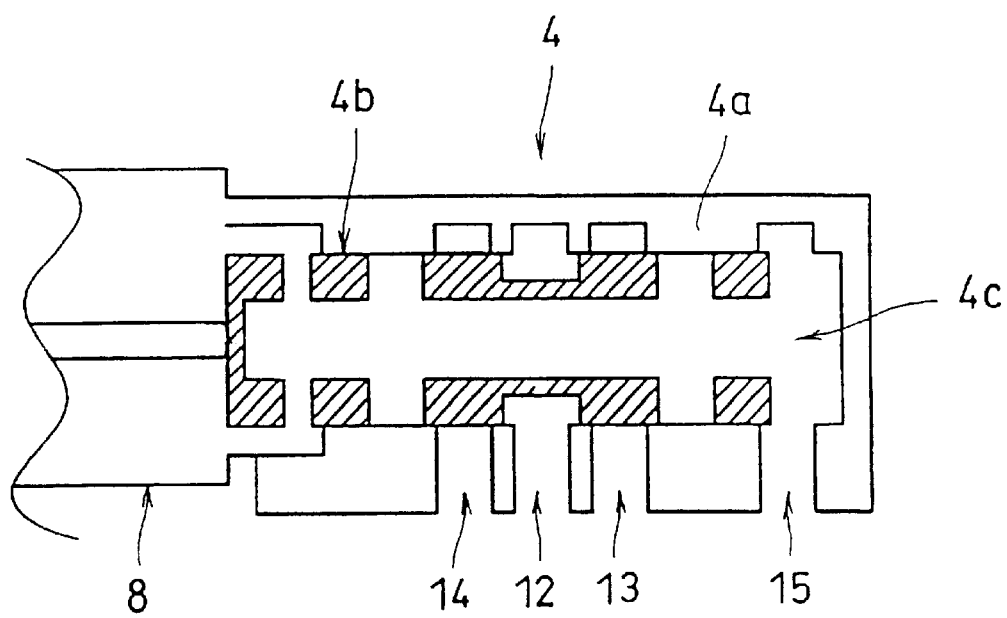
FIG. 6 is a schematic representation of the function of an oil control valve, in particular, at the time when a solenoid is located intermediately.
Figure 7:
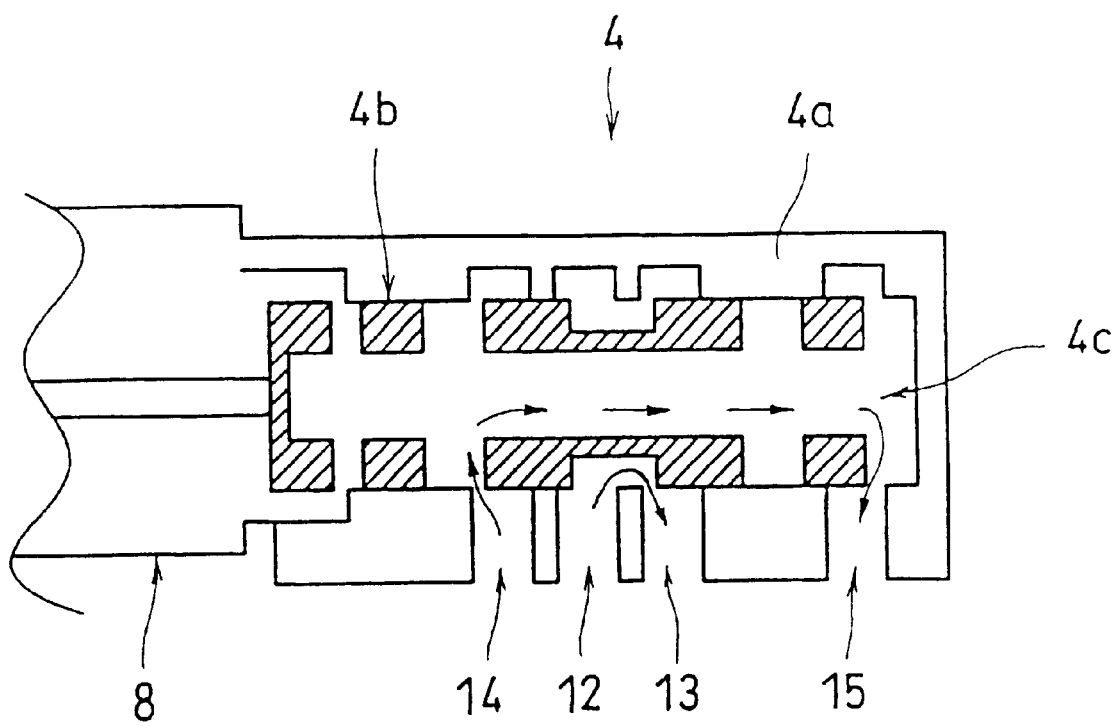
FIG. 7 is a schematic representation of the function of an oil control valve, in particular, a state where a supply port and an advance-angle side port are in communication.
Figure 8:
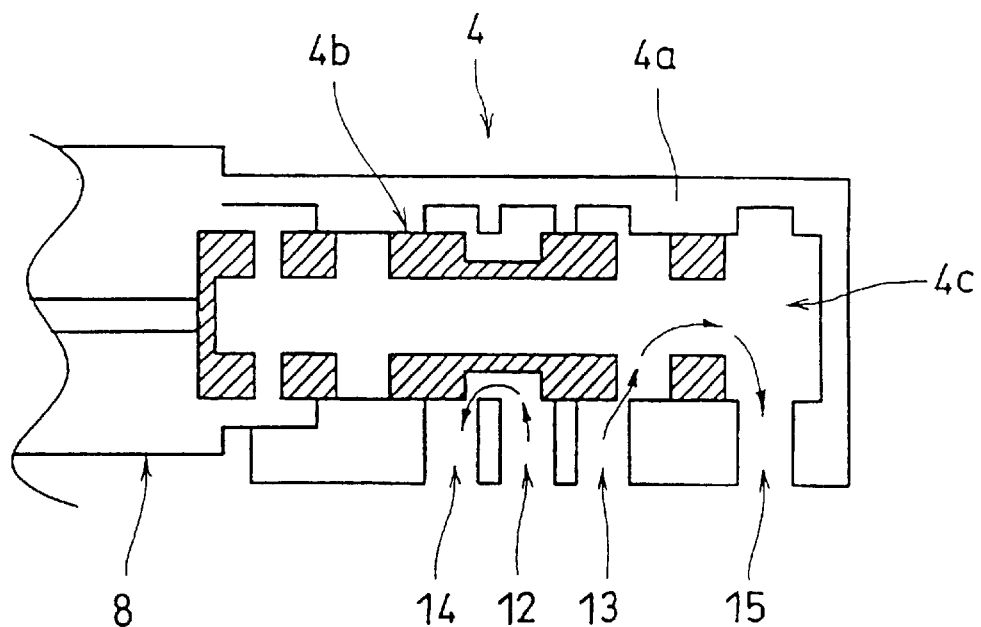
FIG. 8 is a schematic representation of the function of an oil control valve, in particular, a state where a supply port and a delay-angle side port are in communication.
Figure 9:
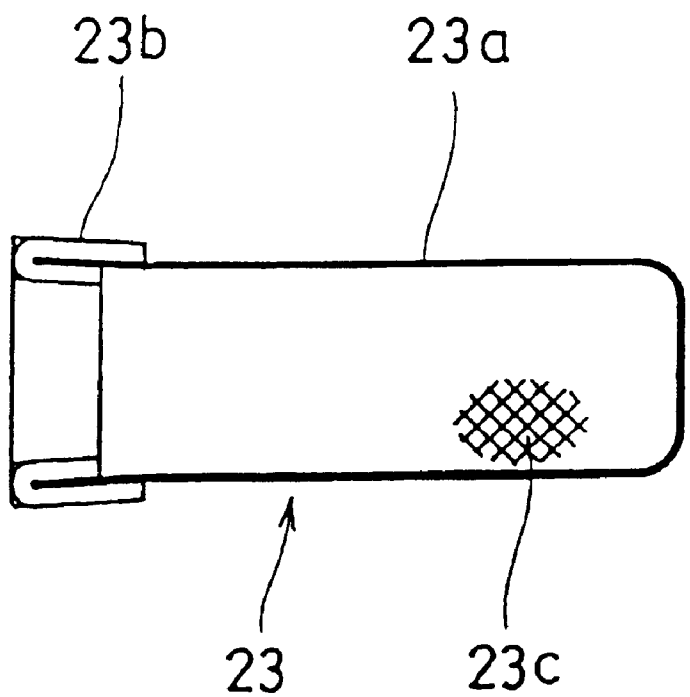
FIG. 9 shows an oil filter of the present invention to be provided in an operation oil pressure circuit of a variable valve timing mechanism.
Figure 10:
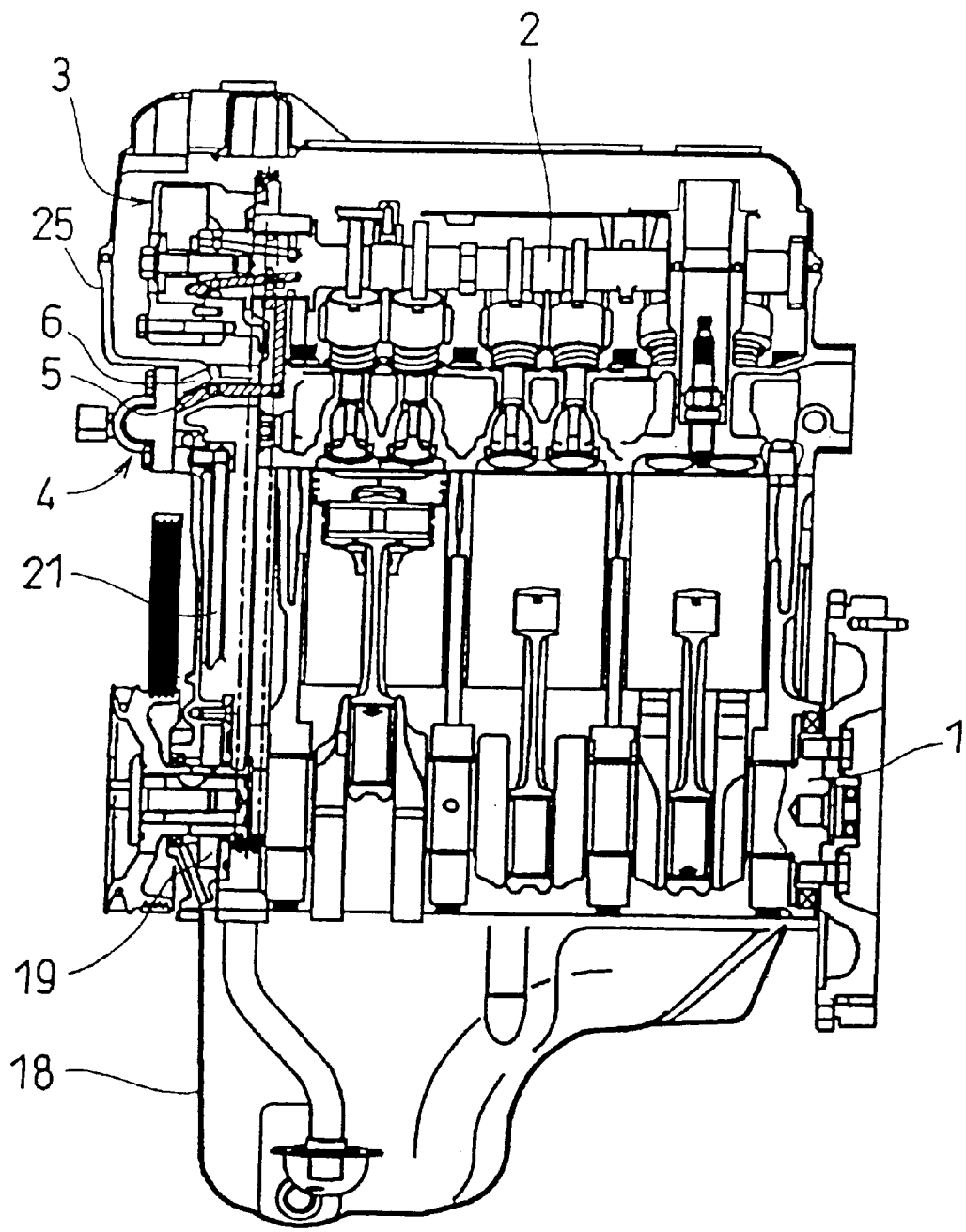
FIG. 10 is a front view of an engine with a variable timing mechanism, partially in section.

Next, a structure of the control valve 4 to control a supply and exhaustion of the operation oil pressure to the actuator 3 is explained. The oil control valve 4 comprises a housing 4a, a spool 4b installed slidably in a spool hole 4c of the housing 4a and a solenoid 8 of a 3-position type to make the spool 4b slide. Solenoid 8 is operated based on a signal of an ECU (electronic control unit) 7 (see FIGS. 4 and 5). The housing 4a is provided with a supply port 12 which is supplied with the operation oil pressurized by the oil pump 19 (see FIG. 3). An advance-angle side port 13 is connected to the advance-angle oil path 5, a delay-angle side port 14 is connected to the delay-angle side oil path 6 and a drain port 15 to return the operation oil exhausted from the advance-angle side oil pressure chamber 16 or delay-angle side oil pressure chamber 17 to the timing chain case 25 (see FIG. 3). Each port is in communication with the spool hole 4c. By moving the spool 4b toward a right direction in FIG. 6 relative to the housing 4a from the intermediate position (see FIG. 6) of the solenoid 8, as shown in FIG. 7, the advance-angle port 13 and the supply port 12 are brought in communication with each other and the delay-angle port 14 and the drain port 15 are brought in communication with each other. By moving the spool 4b toward a left direction in FIG. 6 relative to the housing 4a from the intermediate position (see FIG. 6) of the solenoid 8, as shown in FIG. 8, the delay-angle port 14 and the supply port 12 are brought in communication with each other and the advance-angle port 13 and the drain port 15 are brought in communication with each other. And, as shown in FIG. 6, where the solenoid 8 is positioned at an intermediate position, the advance-angle side port 13, the delay-angle side port 14 and the supply port 12 are in a shuttered state.

Next, an oil path structure in the operation oil pressure circuit is explained. Initially, an oil path 21 for operation oil supplied to the oil control valve 4 is explained. The oil path 21 for operation oil is, as shown in FIGS. 4 and 5, provided on the timing chain case 25 by branching an oil path 20 for lubricant, and structured so as to be in communication with the supply port 12 of the oil control valve 4 set at a given portion of the timing chain case 25. Downstream of the control valve 4, as shown in FIGS. 1 and 3, a advance-angle side oil path 5b is provided, one opening of which is in communication with the advance-angle side oil path 5a and another opening of which is in communication with the advance-angle side port 13. Further, the timing chain case 25 is, as shown in FIGS. 2 and 3, provided with the delay-angle side oil path 6b, one opening of which is in communication with the delay-angle side oil path 6a and another opening of which is in communication with the delay-angle side port 14 of the oil control valve 4.

Next, the structure of the advance-angle side oil path 5b and the delay-angle side oil path 6b is explained in detail. Initially, the advance-angle side oil path 5b is explained. The advance-angle side oil path 5b is structured, as shown in FIG. 1, in such a manner that a hole 28a formed substantially parallel with the camshaft 2 directed from a mounting face 25a of the timing chain case 25 to an oil control valve mounting face 25b and a hole 28b extended toward an axial direction of the hole 28a from an oil control valve mounting face 25b side of the timing chain case 25 are crossed. Further, as shown in FIG. 1, the hole 28b is formed upward so as to be inclined at a given angle from the oil control valve mounting face 25b, a diameter of an opening 28d is formed larger than the other members. The oil filter 23 is formed as a bottomed cylinder with its side 23a made of mesh 23c. Oil filter 23 is set on hole 28b as shown in FIG. 1 by fitting a sleeve 23b at an opening portion 28d formed in the hole 28b on the advance-angle side oil path 5b while its sides 23c face a crossing portion 28c of the hole 28a and the hole 28b.

Next, the delay-angle side oil path 6b is explained based on FIG. 2. The delay-angle side oil path 6b is structured in such a manner that a hole 29a formed substantially parallel with the camshaft 2 directed from a mounting face 25a of the timing chain case 25 to an oil control valve mounting face 25b and a hole 29b extended toward an axial direction of the hole 29a from an oil control valve mounting face 25b side of the timing chain case 25 are crossed. Further, as shown in FIG. 2, the hole 29b is formed upward so as to be inclined at a given angle from the oil control valve mounting face 25b, a diameter of an opening 29d is formed larger than the other members. The oil filter 23 (see FIG. 1) similar to the one set in the hole 28b of the advance-angle side oil path 5b, is set by fitting a sleeve 23b at an opening portion 29d formed in the hole 29b on the delay-angle side oil path 6b while its sides face a crossing portion 29c of the hole 29a and the hole 29b.

An operation of the embodiment of the oil path structure of the present invention is explained. Initially, an operation when the valve timing is shifted to the advance-angle side is explained. At the time of such shifting, the solenoid 8 is driven by a control signal of the ECU (electric control unit) 7, (see FIGS. 4 and 5), thereby shifting the spool 4b of the oil control valve 4 from the intermediate position in FIG. 6 to the right side of FIG. 6. As shown in FIG. 7, the supply port 12 of the oil control valve 4 and the advance-angle port 13 are made to be in communication with each other and simultaneously the drain port 15 and the delay-angle side port 14 are made to be communicated with each other.

Thereby, the operation oil of the advance-angle side oil path 5 is flowed into the advance-angle side oil pressure chamber 16 formed on the actuator 3 of the variable valve timing mechanism, and the operation oil of the delay-angle side oil pressure chamber 17 flows down the delay-angle oil path 6 and flows into the oil control valve 4 after passing through the side face 23a of the oil filter 23 set at the hole 29b and exhausted inside the timing chain case 25 from the drain port 15.

When the valve timing is shifted to the delay-angle side, the solenoid 8 is driven by the control signal of the ECU (electric control unit) 7 (see FIGS. 4 and 5), thereby shifting the spool 4b of the oil control valve 4 to the left side of FIG. 6 from the intermediate position of FIG. 6, and as shown in FIG. 8, so that, the supply port 12 of the oil control valve 4 and the delay-angle side port 14 are in communication with each other and the drain port 15 and the advance-angle side port 13 are in communication with each other. Thereby, the operation oil of the delay-angle side oil path 6 flows in the delay-angle side oil pressure chamber 17 formed in the actuator 3 of the variable valve timing mechanism, and the operation oil of the advance-angle side oil pressure chamber 16 flows down the advance-angle oil path 5 and flows into the oil control valve 4 after passing through the side face 23a of the oil filter 23 set on the hole 28b and is exhausted from the drain port 15 inside of the timing chain case 25.

Accordingly, since the operation oil to be returned to the oil control valve 4 from the variable valve timing mechanism flows in the oil control valve 4 after passing through the oil filter 23, any foreign material existing between the actuator 3 and the oil control valve 4 is filtered before entering sliding portion of the spool 4b of the oil control valve 4 and the operation of the variable valve timing mechanism is thereby prevented from malfunctioning.

Further, since the oil filter 23 is simple in its structure and is able to be assembled by fitting the sleeve 23b in the holes of 28b and 29b, the diameter of the filter can be reduced to decrease its occupied volume and both of the advance-angle side oil path 5 and the delay-angle side oil path 6 can each be provided with the filter 23, respectively. Further, since the oil filter 23 is set so that side face 23a faces the crossing portions 28c and 29c of the advance-angle side oil path 5 and the delay-angle side oil path 6, the effective filter area is increased thereby reducing loss of pressure of the operation oil, and the filter 23 remains unclogged thereby lengthening the maintenance cycle of the filter. And, since the oil filter 23 is set inclined so as to direct upward, the captured or deposited foreign matters in the hole where the filter is set at the downstream of the oil control valve, are easily removed at the time of maintenance.

According to the first aspect of the present invention, since the oil filter is set at the downstream of the oil control valve, possible malfunction of the variable valve timing mechanism, which is caused by any foreign matter existing in the operation oil of the downstream of the oil filter and by being engaged in the sliding portion of the spool of the oil control valve, can be avoided. Further, since the oil filter is set while extending in the axial direction of the oil filter path, the filter diameter can be downsized, so that the oil filter can be set in plural oil paths.

Further, according to the second aspect of the present invention, since the oil filter is set at least in either one of the advance-angle side oil path and the delay-angle side oil path, malfunction of the operation of the variable valve timing mechanism due to foreign matter existing in the operation oil between the actuator of the variable valve timing mechanism and the control valve that controls the supply and exhaust of the operation oil to and from the actuator entering in the oil control valve and becoming engaged in the sliding portion of the spool can be avoided.

Further, according to the third aspect of the present invention, since the side of the oil filter is disposed at each crossing portion of the advance-angle side oil path and the delay-angle side oil path so as to face thereto, the effective area of the filter is broadened and the pressure loss of the operation oil can be outstandingly reduced. Also, clogging of the mesh of the oil filter is avoided thereby lengthening the maintenance cycle of the oil filter.

Further, according to the fourth aspect of the present invention, since the oil filter is set inclined upward linearly, the foreign materials captured by the filter or deposited in the hole in which the oil filter is set can be easily removed.

Further, according to the fifth aspect of the present invention, since the oil filter is set in the oil path by fitting the sleeve in the oil path, the occupied volume of the oil filter can be reduced to enable a filter to be set in both of the advance-angle side oil path and the delay-angle side oil path.

What is claimed is:

1. An oil path structure in an operation oil pressure circuit of a variable valve timing mechanism, in which lubricant is provided by a branched oil path, a supply and exhaust of the operation oil pressure is controlled by an oil control valve, comprises:

an oil filter inserted downstream of the oil control valve while being extended in an axial direction of the oil path;

wherein, between the oil control valve and an actuator of the variable valve timing mechanism, an advance-angle side oil path to operate the actuator to an advance-angle side and a delay-angle side oil path to operate the actuator to a delay-angle side by being loaded with an operation pressure respectively are disposed and the oil filter is set in at least either one of the advance-angle side oil path or the delay-angle side oil path.

2. The oil path structure according to claim 1, wherein a side face of the oil filter is set so as to face a crossing portion of the oil path.

3. The oil path structure according to claim 2, wherein the oil filter is set so as to extend upward linearly from a mounting face of the oil control valve.

4. The oil path structure according to claim 3, wherein the oil filter is provided with a sleeve at an opening and a mesh side thereof is formed cylindrically bottomed to be set in the oil path by being fitted.

5. The oil path structure according to claim 2, wherein the oil filter is provided with a sleeve at an opening and a mesh side thereof is formed cylindrically bottomed to be set in the oil path by being fitted.

6. The oil path structure according to claim 1, wherein the oil filter is set so as to extend upward linearly from a mounting face of the oil control valve.

7. The oil path structure according to claim 6, wherein the oil filter is provided with a sleeve at an opening and a mesh side thereof is formed cylindrically bottomed to be set in the oil path by being fitted.

8. The oil path structure according to claim 1, wherein the oil filter is provided with a sleeve at an opening and a mesh side thereof is formed cylindrically bottomed to be set in the oil path by being fitted.

* * * * *